(12) United States Patent
Tawari et al.

(10) Patent No.: US 11,507,830 B2
(45) Date of Patent: Nov. 22, 2022

(54) SYSTEM AND METHOD FOR PROVIDING OBJECT-LEVEL DRIVER ATTENTION REASONING WITH A GRAPH CONVOLUTION NETWORK

(71) Applicant: Honda Motor Co., Ltd., Tokyo (JP)

(72) Inventors: Ashish Tawari, Santa Clara, CA (US); Zehua Zhang, Bloomington, IN (US)

(73) Assignee: HONDA MOTOR CO., LTD., Tokyo (JP)

( * ) Notice: Subject to any disclaimer, the term of this patent is extended or adjusted under 35 U.S.C. 154(b) by 432 days.

(21) Appl. No.: 16/745,935

(22) Filed: Jan. 17, 2020

(65) Prior Publication Data

US 2021/0081780 A1 Mar. 18, 2021

Related U.S. Application Data

(60) Provisional application No. 62/899,950, filed on Sep. 13, 2019.

(51) Int. Cl.
*G06N 3/08* (2006.01)
*G06F 16/901* (2019.01)
(Continued)

(52) U.S. Cl.
CPC .......... *G06N 3/08* (2013.01); *G06F 16/9024* (2019.01); *G06V 10/25* (2022.01); *G06V 10/454* (2022.01); *G06V 20/58* (2022.01)

(58) Field of Classification Search
CPC .... G06N 3/08; G06N 3/0445; G06F 16/9024; G06V 10/25; G06V 20/58; G06V 10/454; G06K 9/6261
See application file for complete search history.

(56) References Cited

U.S. PATENT DOCUMENTS

| 2017/0206431 A1* | 7/2017 | Sun | G06V 10/454 |
| 2019/0072977 A1* | 3/2019 | Jeon | G06K 9/6261 |
| 2019/0258878 A1* | 8/2019 | Koivisto | G06N 3/0445 |

OTHER PUBLICATIONS

M. Abadi, P. Barham, J. Chen, Z. Chen, A. Davis, J. Dean, M. Devin, S. Ghemawat, G. Irving, M. Isard, M. Kudlur, J. Levenberg, R. Monga, S. Moore, D. G. Murray, B. Steiner, P. Tucker, V. Vasudevan, P. Warden, M. Wicke, Y. Yu, and X. Zheng, "Tensorflow: A system for large-scale machine learning," in USENIX Conference on Operating Systems Design and Implementation, 2016, pp. 265-283.

(Continued)

*Primary Examiner* — Abdul-Samad A Adediran
(74) *Attorney, Agent, or Firm* — Rankin, Hill & Clark LLP

(57) ABSTRACT

A system and method for providing object-level driver attention reasoning with a graph convolution network that include receiving image data associated with a plurality of image clips of a surrounding environment of a vehicle and determining anchor object-ness scores and anchor importance scores associated with relevant objects included within the plurality of image clips. The system and method also include analyzing the anchor object-ness scores and anchor importance scores associated with relevant objects and determining top relevant objects with respect to an operation of the vehicle. The system and method further include passing object node features and edges of an interaction graph through the graph convolution network to update features of each object node through interaction with other object nodes and determining importance scores for the top relevant objects.

20 Claims, 6 Drawing Sheets

(51) Int. Cl.
  *G06V 10/25* (2022.01)
  *G06V 20/58* (2022.01)
  *G06V 10/44* (2022.01)

(56) References Cited

OTHER PUBLICATIONS

G. Bertasius, H. S. Park, S. X. Yu, and J. Shi, "First person action-object detection with egonet," arXiv preprint arXiv:1603. 04908, 2016.
G. Bertasius, H. Soo Park, S. X. Yu, and J. Shi, "Unsupervised learning of important objects from first-person videos," in Proceedings of the IEEE International Conference on Computer Vision, 2017, pp. 1956-1964.
M. C. Bowman, R. S. Johannson, and J. R. Flanagan, "Eye-hand coordination in a sequential target contact task," Experimental brain research, vol. 195, No. 2, pp. 273-283, 2009.
A. Borji, D. N. Sihite, and L. Itti, "Probabilistic learning of task-specific visual attention," in IEEE Conference on Computer Vision and Pattern Recognition (CVPR), 2012.
J. Carreira and A. Zisserman, "Quo vadis, action recognition? a new model and the kinetics dataset," in proceedings of the IEEE Conference on Computer Vision and Pattern Recognition, 2017, pp. 6299-6308.
Y. Chen, M. Rohrbach, Z. Yan, Y. Shuicheng, J. Feng, and Y. Kalantidis, "Graph-based global reasoning networks," in Proceedings of the IEEE Conference on Computer Vision and Pattern Recognition, 2019, pp. 433-442.
F. Chollet, J. Allaire, et al., "R interface to keras," https://keras.rstudio.com, printed on Feb. 9, 2020.
M. Defferrard, X. Bresson, and P. Vandergheynst, "Convolutional neural networks on graphs with fast localized spectral filtering," in Advances in neural information processing systems, 2016, pp. 3844-3852.
J. Deng, W. Dong, R. Socher, L.-J. Li, K. Li, and L. Fei-Fei, "Imagenet: A large-scale hierarchical image database," in 2009 IEEE conference on computer vision and pattern recognition, Ieee, 2009, pp. 248-255.
M. Everingham, L. Van Gool, C. K. I. Williams, J. Winn, and A. Zisserman, The PASCAL Visual Object Classes Challenge 2007 (VOC2007) Results, http://host.robots.ox.ac.uk/pascal/VOC/voc2007, 2007.
M. Gao, A. Tawari, and S. Martin, "Goal-oriented object importance estimation in on-road driving videos," arXiv preprint arXiv:1905. 02848, 2019.
R. Girshick, I. Radosavovic, G. Gkioxari, P. Dollar, and K. He, "Detectron," https://research.fb.com/downloads/detectron, 2018.
M. Hayhoe and D. Ballard, "Eye movements in natural behavior," Trends in cognitive sciences, vol. 9, No. 4, pp. 188-194, 2005.
K. He, G. Gkioxari, P. Dollár, and R. Girshick, "Mask r-cnn," in Proceedings of the IEEE international conference on computer vision, 2017, pp. 2961-2969.
K. He, X. Zhang, S. Ren, and J. Sun, "Deep residual learning for image recognition," in Proceedings of the IEEE conference on computer vision and pattern recognition, 2016, pp. 770-778.
S. Hochreiter and J. Schmidhuber, "Long short-term memory," Neural computation, vol. 9, No. 8, pp. 1735-1780, 1997.
Q. Hou, M.-M. Cheng, X. Hu, A. Borji, Z. Tu, and P. H. Torr, "Deeply supervised salient object detection with short connections," in Proceedings of the IEEE Conference on Computer Vision and Pattern Recognition, 2017, pp. 3203-3212.
Y. Huang, M. Cai, Z. Li, and Y. Sato, "Predicting gaze in egocentric video by learning task-dependent attention transition," in Proceedings of the European Conference on Computer Vision (ECCV), 2018, pp. 754-769.
X. Huang, C. Shen, X. Boix, and Q. Zhao, "Salicon: Reducing the semantic gap in saliency prediction by adapting deep neural networks," in Proceedings of the IEEE International Conference on Computer Vision, 2015, pp. 262-270.
S. Ioffe and C. Szegedy, "Batch normalization: Accelerating deep network training by reducing internal covariate shift," in International Conference on Machine Learning (ICML), 2015.
L. Itti, C. Koch, and E. Niebur, "A model of saliency-based visual attention for rapid scene analysis," IEEE Transactions an Pattern Analysis and Machine Intelligence (PAMI), vol. 20, No. 11, pp. 1254 1259, 1998.
W. Kay, J. Carreira, K. Simonyan, B. Zhang, C. Hillier, S. Vijayanarasimhan, F. Viola, T. Green, T. Back, P. Natsev, et al., "The kinetics human action video dataset," arXiv preprint arXiv:1705. 06950, 2017.
T. N. Kipf and M. Welling, "Semi-supervised classification with graph convolutional networks," arXiv preprint arXiv:1609.02907, 2016.
S. Lazzari, D. Mottet, and J.-L. Vercher, "Eye-hand coordination in rhythmical pointing," Journal of motor behavior, vol. 41, No. 4, pp. 294-304, 2009.
Y. J. Lee, J. Ghosh, and K. Grauman, "Discovering important people and objects for egocentric video summarization," in 2012 IEEE Conference on Computer Vision and Pattern Recognition. IEEE, 2012, pp. 1346-1353.
Y. Li, A. Fathi, and J. M. Rehg, "Learning to predict gaze in egocentric video," in IEEE International Conference on Computer Vision (ICCV), 2013.
Y. Li and A. Gupta, "Beyond grids: Learning graph representations for visual recognition," in Advances in Neural Information Processing Systems, 2018, pp. 9225-9235.
T.-Y. Lin, M. Maire, S. Belongie, J. Hays, P. Perona, D. Ramanan, P. Dollár, and C. L. Zitnick, "Microsoft coco: Common objects in context," in European conference on computer vision. Springer, 2014, pp. 740-755.
N. Liu and J. Han, "Dhsnet: Deep hierarchical saliency network for salient object detection," in Proceedings of the IEEE Conference on Computer Vision and Pattern Recognition, 2016, pp. 678-686.
J. Long, E. Shelhamer, and T. Darrell, "Fully convolutional networks for semantic segmentation," in Proceedings of the IEEE conference on computer vision and pattern recognition, 2015, pp. 3431-3440.
M. Ma, H. Fan, and K. M. Kitani, "Going deeper into first-person activity recognition," in Proceedings of the IEEE Conference on Computer Vision and Pattern Recognition, 2016, pp. 1894-1903.
M. C. Mozerand M. Sitton, "Computational modeling of spatial attention," Attention, vol. 9, pp. 341-393.
A. Palazzi, D. Abati, F. Solera, R. Cucchiara, et al., "Predicting the driver's focus of attention: the dr (eye) ve project," IEEE transactions on pattern analysis and machine intelligence, vol. 41, No. 7, pp. 1720-1733, 2018.
S. Perone, K. L. Madole, S. Ross-Sheehy, M. Carey, and L. M. Oakes, "The relation between infants' activity with objects and attention to object appearance." Developmental psychology, vol. 44, No. 5, p. 1242, 2008.
H. Pirsiavash and D. Ramanan, "Detecting activities of daily living in first-person camera views." in CVPR, 2012, pp. 2847-2854.
S. Ren, K. He, R. Girshick, and J. Sun, "Faster r-cnn: Towards real-time object detection with region proposal networks," in Advances in neural information processing systems, 2015, pp. 91-99.
C. Szegedy, W. Liu, Y. Jia, P. Sermanet, S. Reed, D. Anguelov, D. Erhan, V. Vanhoucke, and A. Rabinovich, "Going deeper with convolutions," in Proceedings of the IEEE conference on computer vision and pattern recognition, 2015, pp. 1-9.
E. D. Vidoni, J. S. McCarley, J. D. Edwards, and L. A. Boyd, "Manual and oculomotor performance develop contemporaneously but independently during continuous tracking," Experimental brain research, vol. 195, No. 4, pp. 611-620, 2009.
X. Wang and A. Gupta, "Videos as space-time region graphs," in Proceedings of the European Conference on Computer Vision (ECCV), 2018, pp. 399-417.
Y. Xia, D. Zhang, J. Kim, K. Nakayama, K. Zipser, and D. Whitney, "Predicting driver attention in critical situations," in Asian Conference on Computer Vision. Springer, 2018, pp. 658-674.

(56) References Cited

OTHER PUBLICATIONS

K. Yamada, Y. Sugano, T. Okabe, Y. Sato, A. Sugimoto, and K. Hiraki, "Attention prediction in egocentric video using motion and visual saliency," in Advances in Image and Video Technology, Y.-S. Ho, Ed., 2012, pp. 277-288.
J. Yang, J. Lu, S. Lee, D. Batra, and D. Parikh, "Graph r-cnn for scene graph generation," in Proceedings of the European Conference on Computer Vision (ECCV), 2018, pp. 670-685.
Z. Zhang, S. Bambach, C. Yu, and D. J. Crandall, "From coarse attention to fine-grained gaze: A two-stage 3d fully convolutional network for predicting eye gaze in first person video," in British Machine Vision Conference (BMVC), 2018.
M. Zhang, K. T. Ma, J. H. Lim, Q. Zhao, and J. Feng, "Deep future gaze: Gaze anticipation on egocentric videos using adversarial networks," in IEEE Conference on Computer Vision and Pattern Recognition (CVPR), 2017.
P. Zhang, D. Wang, H. Lu, H. Wang, and X. Ruan, "Amulet: Aggregating multi-level convolutional features for salient object detection," in Proceedings of the IEEE International Conference on Computer Vision, 2017, pp. 202-211.
T. Judd, K. Ehinger, F. Durand, and A. Torralba, "Learning to predict where humans look," in 2009 IEEE 12th international conference on computer vision. IEEE, 2009, pp. 2106-2113.
Tawari and B. Kang, "A computational framework for driver's visual attention using a fully convolutional architecture," in 2017 IEEE Intelligent Vehicles Symposium (IV). IEEE, 2017, pp. 887-894.
A. Tawari, P. Mallela, and S. Martin, "Learning to attend to salient targets in driving videos using fully convolutional rnn," in 2018 21st International Conference on Intelligent Transportation Systems (ITSC). IEEE, 2018, pp. 3225-3232.

* cited by examiner

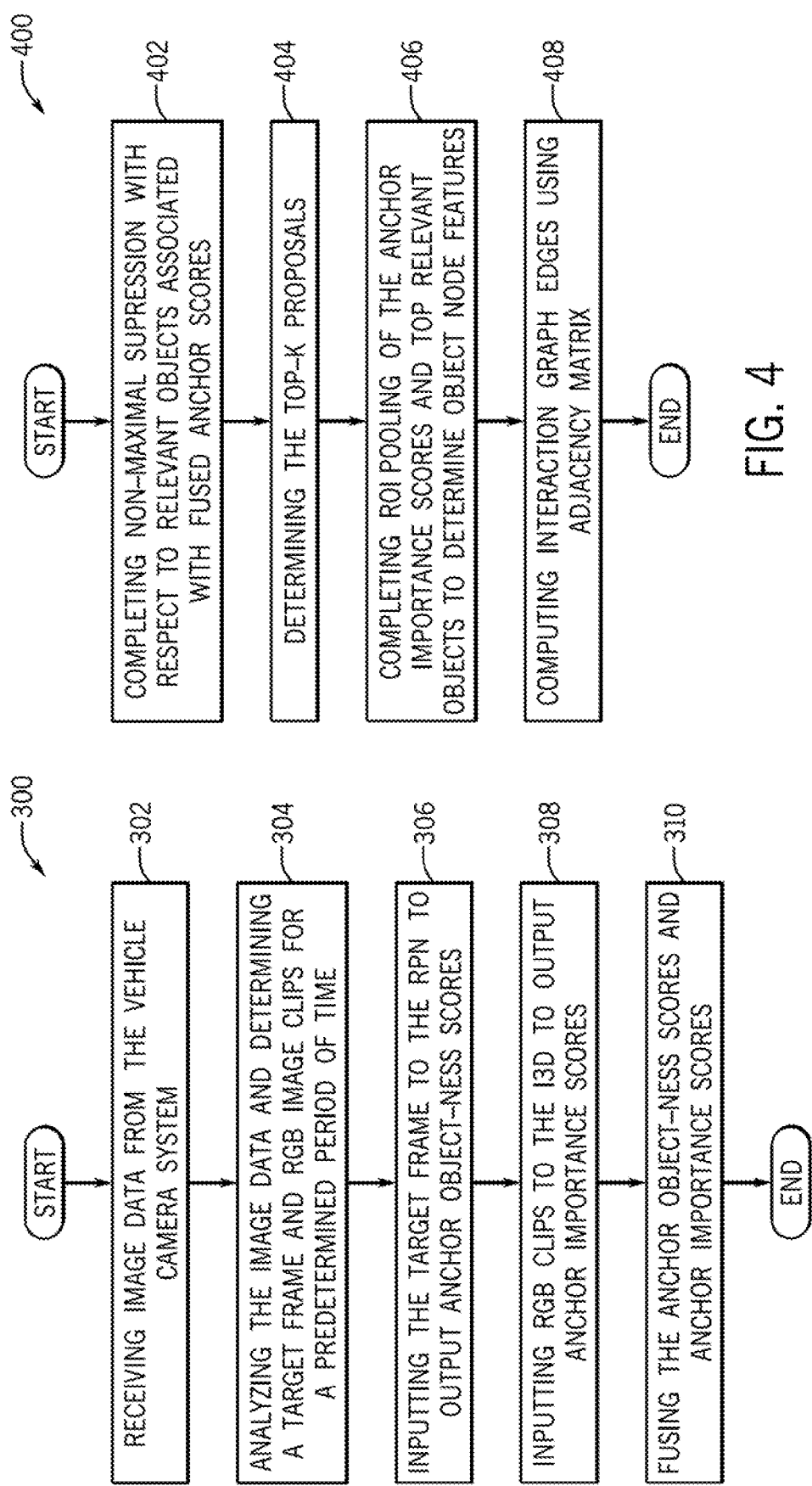

SYSTEM AND METHOD FOR PROVIDING OBJECT-LEVEL DRIVER ATTENTION REASONING WITH A GRAPH CONVOLUTION NETWORK

CROSS-REFERENCE TO RELATED APPLICATION

This application claims priority to U.S. Provisional Application Ser. No. 62/899,950 filed on Sep. 13, 2019, which is expressly incorporated herein by reference.

BACKGROUND

Automated driving in highly interactive scenarios is challenging as it involves different levels of scene analysis, situation understanding, intention prediction, decision making, and planning. There have been advances in modeling that pertains to determining object detection and object level reasoning. Much work has focused on pixel-level saliency based on human eye gaze. However, human eye gaze may sometimes fall on regions with no relationship to a driving task that may skew determinations with respect to scene analysis, situation understanding, intention prediction, decision making, and planning. Recent work has also focused on the detection of object-level reasoning. However, there is a requirement of an input of goal information. Additionally, object detection and tracking for each frame of a clip is required. This requirement may utilize higher computational processing power and may be time-consuming.

BRIEF DESCRIPTION

According to one aspect, a computer-implemented method for providing object-level driver attention reasoning with a graph convolution network that includes receiving image data associated with a plurality of image clips of a surrounding environment of a vehicle and determining anchor object-ness scores and anchor importance scores associated with relevant objects included within the plurality of image clips. The computer-implemented method also includes analyzing the anchor object-ness scores and anchor importance scores associated with relevant objects and determining top relevant objects with respect to an operation of the vehicle. Object node features associated with the top relevant objects and edges of an interaction graph that pertain to the surrounding environment of the vehicle are determined. The computer-implemented method further includes passing the object node features and the edges of the interaction graph through the graph convolution network to update features of each object node through interaction with other object nodes and determining importance scores for the top relevant objects.

According to another aspect, a system for providing object-level driver attention reasoning with a graph convolution network that includes a memory storing instructions when executed by a processor cause the processor to receive image data associated with a plurality of image clips of a surrounding environment of a vehicle and determine anchor object-ness scores and anchor importance scores associated with relevant objects included within the plurality of image clips. The instructions also cause the processor to analyze the anchor object-ness scores and anchor importance scores associated with relevant objects and determining top relevant objects with respect to an operation of the vehicle. Object node features associated with the top relevant objects and edges of an interaction graph that pertain to the surrounding environment of the vehicle are determined. The instructions further cause the processor to pass the object node features and the edges of the interaction graph through the graph convolution network to update features of each object node through interaction with other object nodes and determining importance scores for the top relevant objects.

According to yet another aspect, a non-transitory computer readable storage medium storing instructions that when executed by a computer, which includes a processor perform a method that includes receiving image data associated with a plurality of image clips of a surrounding environment of a vehicle and determining anchor object-ness scores and anchor importance scores associated with relevant objects included within the plurality of image clips. The method also includes analyzing the anchor object-ness scores and anchor importance scores associated with relevant objects and determining top relevant objects with respect to an operation of the vehicle. Object node features associated with the top relevant objects and edges of an interaction graph that pertain to the surrounding environment of the vehicle are determined. The method further includes passing the object node features and the edges of the interaction graph through a graph convolution network to update features of each object node through interaction with other object nodes and determining importance scores for the top relevant objects.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 3 is a process flow diagram of a method for determining and fusing anchor scores associated with relevant objects that are located within a surrounding environment of a vehicle according to an exemplary embodiment of the present disclosure;

FIG. 4 is a process flow diagram of a method of utilizing non-maximal suppression for object detection of the relevant objects and determining top relevant object proposals according to an exemplary embodiment of the present disclosure;

DETAILED DESCRIPTION

Figure 1:
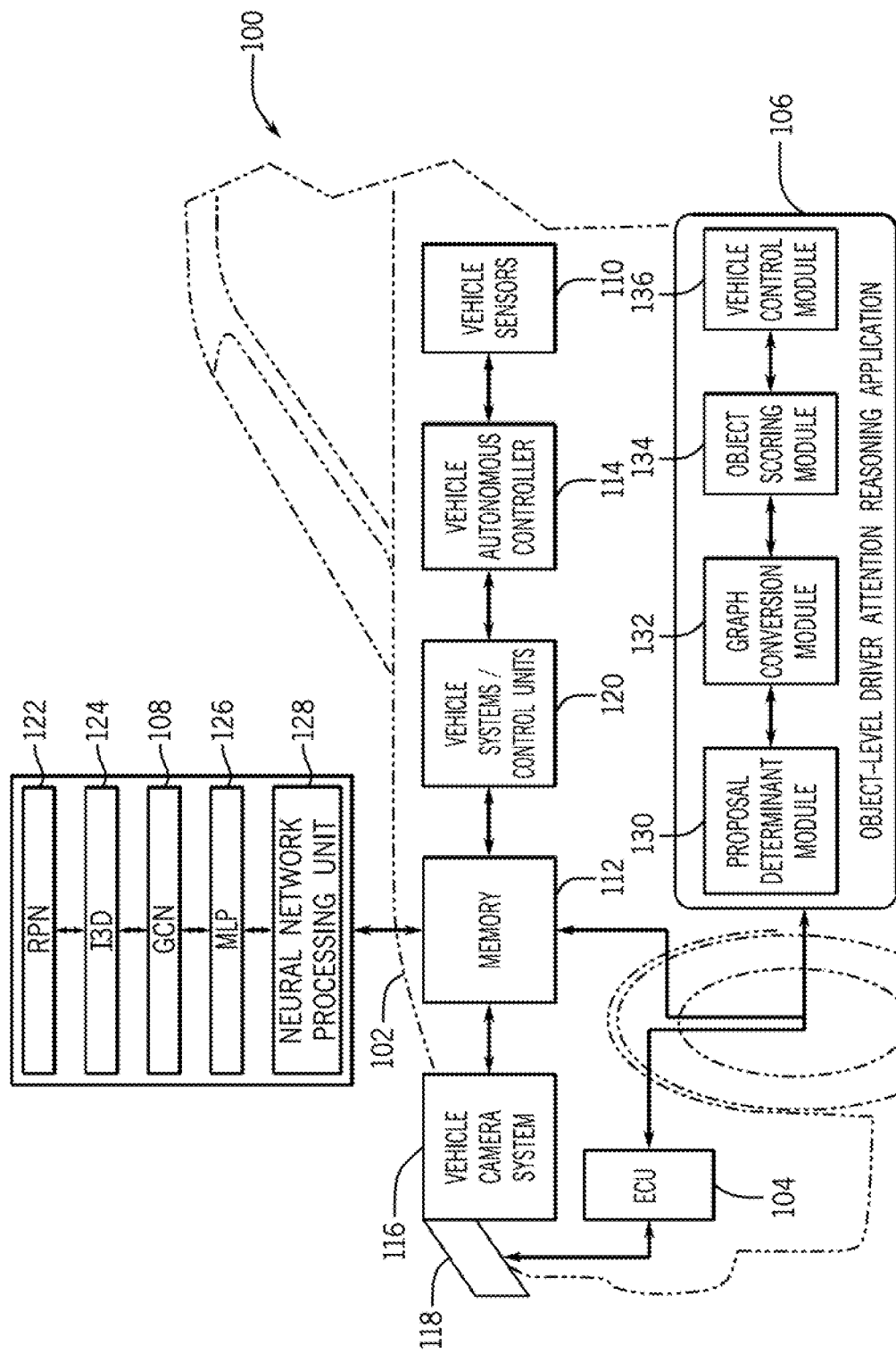
FIG. 1 is a schematic view of an exemplary operating environment for implementing systems and methods for providing object-level driver attention reasoning with a graph convolution network according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary operating environment 100 for implementing systems and methods for providing object-level driver attention reasoning with a graph convolution network according to an exemplary embodiment of the present disclosure. The components of the environment 100, as well as the components of other systems, hardware architectures, and software architectures discussed herein, may be combined, omitted, or organized into different architectures for various embodiments.

Generally, the environment 100 includes an ego vehicle (vehicle) 102 with an electronic control unit (ECU) 104 that executes one or more applications, operating systems, vehicle system and subsystem user interfaces, among others. The ECU 104 may also execute an object-level driver attention reasoning application (attention reasoning application) 106 that may be configured to provide object-level driver attention reasoning with a graph convolutional network (GCN) 108. The attention reasoning application 106 may be configured to allow estimation of important objects that are located within a surrounding environment (e.g., predetermined surrounding distance) of the vehicle 102 are for making real-time decisions that may explain and/or mimic driver attention reasoning with respect to operation of the vehicle 102 within the surrounding environment of the vehicle 102.

As discussed in more detail below, the attention reasoning application 106 may be configured to receive continuous video of a surrounding environment of the vehicle 102. The video may be divided into red green blue (RGB) image clips and a target frame may be selected. In one configuration, the attention reasoning application 106 may be configured to complete an object-ness determination and an object importance determination to with respect to the determination of one or more relevant objects that may have a potential influence with respect to the driving/operation of the vehicle 102. The one or more relevant objects may include, but may not be limited to, automobiles, pedestrians, bicyclists, traffic lights, road signs, lamp posts, trains, buses, etc. that may have an influence with respect to the driving/operation of the vehicle 102.

Upon detecting the one or more relevant objects the attention reasoning application 106 may analyze data associated with the one or more relevant objects to determine top-K relevant object proposals (top relevant objects) of the top k number (e.g., top 5) of relevant objects that may be most likely to influence the path of the vehicle 102 (e.g., interfere with the path, influence a change in trajectory of the vehicle 102) during the driving/operation of the vehicle 102. The application 106 may determine object node features and edges of an interaction graph that is representative of the surrounding environment of the vehicle 102 based on the top relevant objects.

As discussed in more detail below, such data may be inputted to a graph convolutional neural network (GCN) 108 to update features of each object node which may be updated by interacting with other object nodes through graph convolution to determine importance scores for each top relevant object located within the surrounding environment of the vehicle 102. The importance scores may be applied with respect to object level-driving attention reasoning. In one embodiment, one or more of the top rated relevant objects may be further classified as important objects based on a comparison between the respective importance scores and a predetermined importance scoring threshold value.

Stated differently, based on the assigned object importance scores, one or more top relevant objects may be classified as important objects based on a respective degree of influence with respect to driving control decisions when providing autonomous driving capabilities and driving assistance systems. For example, the one or more top relevant objects may be assigned with respective importance scores and the one or more top relevant objects may be classified as important objects based on a comparison of the respective importance scores and the predetermined importance scoring threshold value that may pertain to a potential overlap and/or a distance with respect to a current and/or potential path of the vehicle 102.

In one or more embodiments, the attention reasoning application 106 may be configured to analyze the assigned object importance scores associated with one or more important objects that are determined to be located within the surrounding environment of the vehicle 102. In particular, the attention reasoning application 106 may be configured to control the vehicle 102 to preemptively adapt to the positions, locations, and/or potential overlap between one or more important objects that may be based on their respective importance scores. Accordingly, one or more important objects with higher importance scores may have a respective higher degree of influence with respect to driving control decisions that may be utilized to provide autonomous driving capabilities and to provide driving assistance systems. Therefore, the attention reasoning application 106 may effectively model the interactions among objects located within the surrounding environment of the vehicle 102 with a computed interaction graph and may utilize the GCN 108 to determine an importance of particular important objects to be accounted for when providing autonomous driving capabilities and driving assistance systems with attention reasoning.

With continued reference to FIG. 1, in addition to the ECU 104, the vehicle 102 may also include a plurality of additional components, for example, vehicle sensors 110, a memory 112, a vehicle autonomous controller 114, a vehicle camera system 116, one or more cameras 118, and a vehicle systems/control units 120. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the vehicle 102.

The ECU 104 may also include a communication device (not shown) for sending data internally within (e.g., between one or more components) the vehicle 102 and communicating with externally hosted computing systems (e.g., external to the vehicle 102). Generally, the ECU 104 may communicate with the memory 112 to execute the one or more applications, operating systems, vehicle system and subsystem user interfaces, and the like that are stored within the memory 112.

In one embodiment, the ECU 104 may communicate with the vehicle autonomous controller 114 to execute autonomous driving commands to operate the vehicle 102 to be fully autonomously driven or semi-autonomously driven in a particular manner that may be based on the level of importance that may be associated with one or more important objects. In some cases, the autonomous driving commands may also be executed to operate the vehicle 102 and/or one or more external factors to be fully autonomously driven or semi-autonomously driven in a particular manner that may be based on one or more additional factors that may include, but may not be limited to, a lane in which the vehicle 102 is traveling, status of traffic signals, traffic patterns, traffic regulations, etc.

As discussed below, based on the classification of one or more important objects and the analysis of the object importance scores associated with each of the one or more important objects located within the surrounding environment of the vehicle 102, the attention reasoning application 106 may be configured to communicate one or more commands (e.g., data signals) to the ECU 104 and/or a vehicle autonomous controller 114 of the vehicle 102 to autonomously control the vehicle 102 to be operated based on the importance score(s).

The respective importance score associated with each top relevant object may thereby be utilized to provide autonomous driving capabilities and to provide driving assistance systems based on one or more commands that may be provided by the vehicle autonomous controller 114 and/or the ECU 104 to one or more of the vehicle systems/control units 120 of the vehicle 102. The vehicle autonomous controller 114 may be configured to provide the one or more commands to one or more of the vehicle systems/control units 120 to provide full autonomous or semi-autonomous control of the vehicle 102. Such autonomous control of the vehicle 102 may be provided by sending one or more commands to control one or more of the vehicle systems/control units 120 to operate (e.g., drive) the vehicle 102 during one or more circumstances (e.g., when providing driver assist controls), and/or to fully control driving of the vehicle 102 during an entire trip of the vehicle 102.

The one or more commands may be provided to one or more vehicle systems/control units 120 that include, but are not limited to an engine control unit, a braking control unit, a transmission control unit, a steering control unit, and the like to control the vehicle 102 to be autonomously driven based on data communicated by the attention reasoning application 106. As such, the vehicle 102 may be autonomously or semi-autonomously operated based on the level of importance that may be associated with the positons, locations, and/or potential overlap with respect to the one or more important objects.

In one embodiment, the attention reasoning application 106 may be configured to communicate with the ECU 104 and/or the one or more vehicle systems/control units 120 to provide warnings/alerts to a driver of the vehicle (e.g., if the vehicle 102 is being driven by a driver and not autonomously) for safety enhancement purposes based on the degree of influence associated with each of the important objects with respect to driving control decisions for a driver of the vehicle 102. The vehicle systems/control units 120 may also include Advanced Driver Assistance Systems (ADAS), for example, an adaptive cruise control system, a blind spot monitoring system, a collision mitigation system, a lane departure warning system, among others (not individually shown) that may be utilized to provide warnings/alerts to the driver of the vehicle 102 (e.g., in a circumstance that the vehicle 102 is being driven by a driver and not being fully autonomously controlled) for preemptive safety purposes based on the level of importance that may be associated with the positons, locations, and/or potential overlap with respect to the one or more important objects.

In one embodiment, the vehicle systems/control units 120 may be operably connected to vehicle sensors 110 of the vehicle 102. The vehicle sensors 110 may include, but are not limited to, sensors associated with the vehicle systems/control units 120 and other sensors associated with one or more electronic components and/or mechanical components (not shown) of the vehicle 102. In one or more embodiments, one or more of the vehicle sensors 110 may provide sensor data to the vehicle autonomous controller 114 to be utilized in addition to data that is communicated by the attention reasoning application 106 to autonomously control the vehicle 102.

In one configuration, the memory 112 of the vehicle 102 may be configured to store one or more executable files associated with one or more operating systems, applications, associated operating system data, application data, vehicle system and subsystem user interface data, and the like that are executed by the ECU 104. In one or more embodiments, the memory 112 of the vehicle 102 may be accessed by the attention reasoning application 106 to store data, for example, image data associated with RGB images received by the application 106 that may be output by the vehicle camera system 116.

In some embodiments, the memory 112 may include one or more object models (not shown) that may be associated with one or more types of objects. The one or more object models may represent values that include a range of sizes and features (based on image data) that are associated to respective types of objects (e.g., automobiles, pedestrians, bicyclists, traffic light, road sign, lamp post, train, bus, etc.) In some configurations, the application 106 may analyze the object models to identify particular objects that may be utilized by the vehicle systems/control units 120 to provide specific object warnings (e.g., pedestrian crossing warning, blind spot warning).

With continued reference to FIG. 1, the vehicle camera system 116 may include one or more of the cameras 118 that may be positioned in one or more directions and at one or more areas to capture one or more images of the surrounding environment of the vehicle 102. The one or more cameras 118 of the vehicle camera system 116 may be disposed at external front portions of the vehicle 102, including, but not limited to different portions of the vehicle dashboard, vehicle bumper, vehicle front lighting units, vehicle fenders, and the windshield. In one embodiment, the one or more cameras 118 may be configured as RGB cameras that may capture RGB bands that are configured to capture rich information about object appearance, as well as relationships and interactions between the vehicle 102 and objects within the surrounding environment of the vehicle 102.

In other embodiments, the one or more cameras 118 may be configured as stereoscopic cameras that are configured to capture environmental information in the form three-dimensional images. In one or more configurations, the one or more cameras 118 may be configured to capture one or more first person viewpoint RGB images/videos of the surrounding environment of the vehicle 102. The vehicle camera system 116 may be configured to convert one or more RGB images/videos (e.g., sequences of images) into image data that is communicated to the attention reasoning application 106 to be analyzed.

As discussed, the image data that may be provided by the vehicle camera system 116 to the attention reasoning application 106 may be further evaluated and processed based on the utilization of a plurality of neural networks 108, 122, 124, 126. The attention reasoning application 106 may be configured to utilize the plurality of neural networks 108, 122, 124, 126 that may be configured to receive particular inputs of data and to output respective data that may be utilized to determine an importance score that is associated with each top relevant object that is located within the surrounding environment of the vehicle 102. As discussed, such a determination may be mainly made based on image data pertaining to the RGB images/video of the surrounding environment of the vehicle 102 that are captured by the one or more cameras 118 of vehicle camera system 116.

In an exemplary embodiment, the plurality of neural networks 108, 122, 124, 126 may include, but may not be limited to, the GCN 108, a reason proposal neural network (RPN) 122, an I3D convolutional neural network (I3D) 124, and a multi-layer perceptron neural network (MLP) 126. However, it is to be appreciated that one or more additional or alternate types/configurations of neural networks (e.g., deep neural networks, convolutional networks, additional convolutional layers, fully connected layers, etc.) may be included within the environment 100. In one or more embodiments, the plurality of neural networks 108-126 may be operably controlled by a neural network processing unit 128.

The neural network processing unit 128 may be configured to provide processing capabilities to be configured to utilize machine learning/deep learning to provide artificial intelligence capabilities that may be utilized to output data by each of the plurality of neural networks 108-126 to the attention reasoning application 106. The neural network processing unit 128 may process information that is provided as inputs and may access one or more stored pre-trained datasets to provide various functions, that may include, but may not be limited to, object-ness scoring, importance scoring, feature recognition and scoring, computer vision, speed recognition, machine translation, path prediction, autonomous driving commands, and the like.

In an exemplary embodiment, the RPN 122 may be configured to receive one or target frames as inputs that may be inputs. The RPN 122 may be configured as a faster R-CNN network that may analyze the target input frame(s) against pre-trained dataset. The RPN 122 may utilize an anchor and apply IoU (intersection over union) values to compute a plurality of anchor boxes upon one or more objects that may be located within the surrounding environment of the vehicle 102 as included within the target frame(s). As discussed below, the RPN 122 may be configured to output anchor object-ness scores that may be associated with one or more objects that may be encompassed within one or more anchor boxes computed by the RPN 122 to determine one or more relevant objects out of the one or more objects located within the surrounding environment of the vehicle 102.

In one embodiment, the I3D 124 may be configured as a convolutional neural network that may be trained for image/video classification on a pre-trained dataset. The I3D 124 may be configured as a feature extractor to extract features and to determine anchor importance scores that may be fused with the anchor object-ness scores to determine top-k relevant object proposals that may be most likely to interfere with the path of the vehicle 102 during the driving/operation of the vehicle 102.

In one or more embodiments, the GCN 108 may be configured to receive inputs in the form of interactions through a computed interaction graph with features pooled from the I3D 124 as object nodes and edges. The GCN 108 may be configured to analyze the nodes that may represent top relevant objects and graph edges as determined using an agency matrix (e.g., an input feature matrix N×F° feature matrix, X, where N is the number of nodes and F° is the number of input features for each node and an N×N matrix representation of the graph structure such as the adjacency matrix A) to thereby update the node features based on neighbor nodes and to output the updated node features to capture to a long-range relationship with other nodes. Stated differently, the GCN 108 may be configured to output updated node features of object nodes associated with top relevant objects by interacting with neighboring object nodes through graph convolution based on learnt interaction graph edges.

In one embodiment, the updated node features may be inputted to the MLP 126. The MLP 126 may include multi-layer perceptrons that are simple computational units that have weighted input signals and may compute final importance score estimations that may be associated with each of top relevant object. As discussed, based on the analysis of the assigned object importance scores, the attention reasoning application 106 may be configured to classify one or more top relevant objects as important objects and may communicate one or more commands to the ECU 104 and/or a vehicle autonomous controller 114 of the vehicle 102 to autonomously control the vehicle 102 based on the importance score(s) that may be associated with one or more important objects.

II. The Object-Level Driver Attention Reasoning Application and Related Methods

Components of the attention reasoning application 106 will now be described according to an exemplary embodiment and with reference to FIG. 1. In an exemplary embodiment, the attention reasoning application 106 may be stored on the memory 112 and executed by the ECU 104 of the vehicle 102. In another embodiment, the attention reasoning application 106 may be stored on an externally hosted computing infrastructure (not shown) and may be accessed by a communication device (not shown) of the vehicle 102 to be executed by the ECU 104 of the vehicle 102.

The general functionality of attention reasoning application 106 will now be discussed. In an exemplary embodiment, the attention reasoning application 106 may include a proposal determinant module 130, a graph conversion module 132, an object scoring module 134, and a vehicle control module 136. However, it is appreciated that the attention reasoning application 106 may include one or more additional modules and/or sub-modules that are included in lieu of the modules 130-136.

Figure 2:
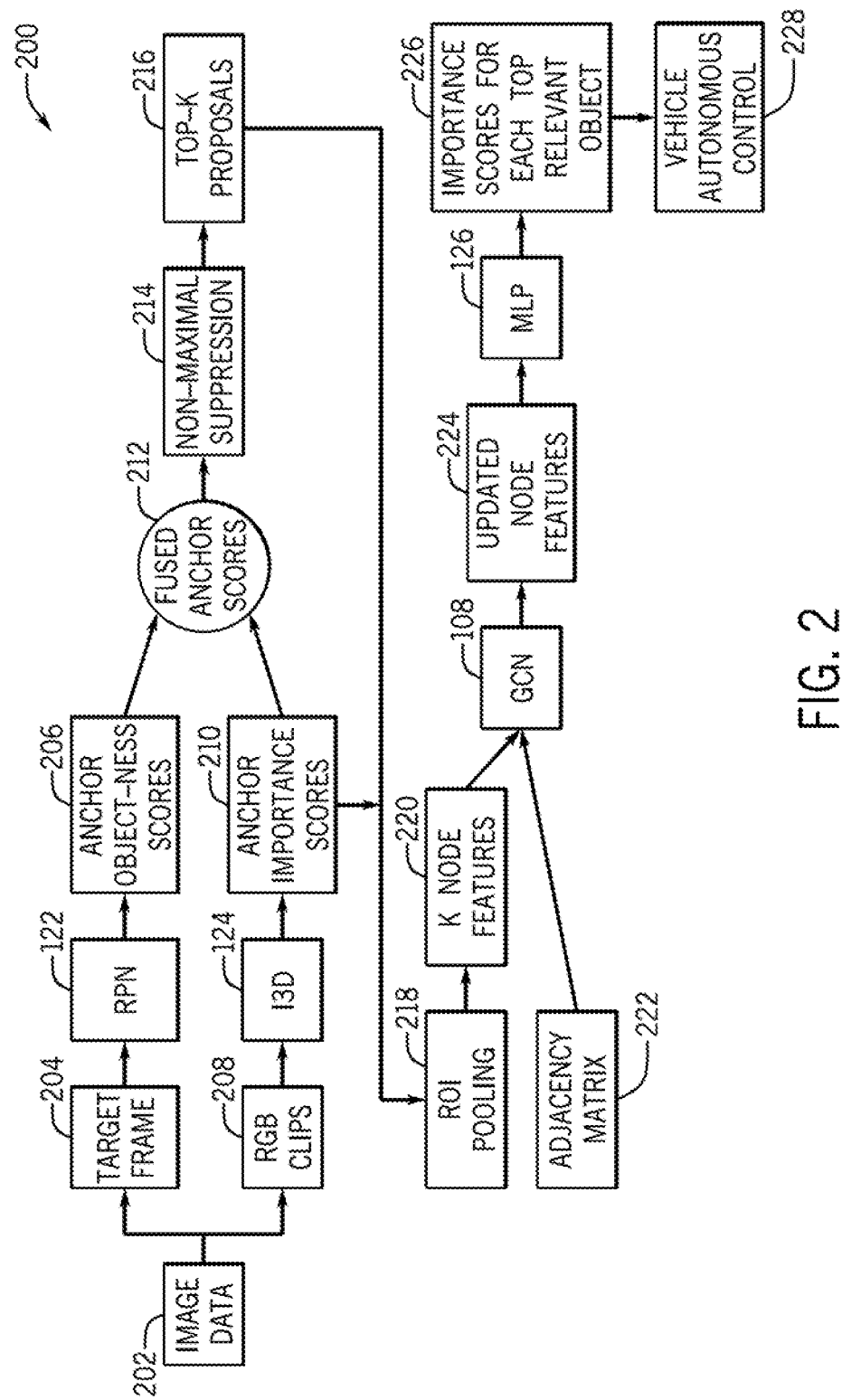
FIG. 2 is a general schematic overview for providing object-level driver attention reasoning with the graph convolution network by an attention reasoning application according to an exemplary embodiment of the present disclosure.

FIG. 2 is a general schematic overview 200 for providing object-level driver attention reasoning with the GCN 108 by the attention reasoning application 106 according to an exemplary embodiment of the present disclosure. The components of the schematic overview 200 will be described in detail below with respect to the execution of methods by the attention reasoning application 106. FIG. 3 is a process flow diagram of a method 300 for determining and fusing anchor scores associated with relevant objects that are located within the surrounding environment of the vehicle 102 according to an exemplary embodiment of the present disclosure. FIG. 3 will be described with reference to the components of FIG. 1 and FIG. 2 though it is to be appreciated that the method 300 of FIG. 3 may be used with other systems/components. The method 300 may begin at block 302, wherein the method 300 may include receiving image data 202 from the vehicle camera system 116.

In an exemplary embodiment, the proposal determinant module 130 of the attention reasoning application 106 may be configured to communicate with the vehicle camera system 116 to receive image data 202 (as shown in FIG. 2). As discussed above, the image data 202 may pertain to one or more RGB images/video of the surrounding environment of the vehicle 102 that are captured by one or more cameras 118 that are operably connected to the vehicle camera system 116. In some embodiments, the proposal determinant module 130 may package and store the image data on the memory 112 to be evaluated at one or more points in time.

The method 300 may proceed to block 304, wherein the method 300 may include analyzing the image data 202 and determining a target frame 204 and RGB image clips 208 for a predetermined period of time. In an exemplary embodiment, the proposal determinant module 130 may be configured to analyze the image data to determine a plurality of RGB image clips 208. The RGB image clips 208 may include spliced sectionalized image clips of an entire video of a length that pertains to a predetermined period of time (e.g., 7 seconds). Each of the RGB image clips 208 may include an n number of pixels that include portions of the surrounding environment of the vehicle 102 as captured within the RGB images/video by the camera(s) 118 of the vehicle camera system 116. The proposal determinant module 130 be further configured to determine image frames that are included within the RGB image clips 208.

In an exemplary embodiment, the proposal determinant module 130 may select a target frame 204 from the image frames that are included within the RGB image clips 208. In one configuration, the target frame 204 may include a middle frame (in the online detection setting) of the image frames that are included within the RGB image clips 208. In another configuration, the target frame 204 may include a last frame (in the online detection setting) of the image frames that are included within the RGB image clips 208.

The method 300 may proceed to block 306, wherein the method 300 may include inputting the target frame 204 to the RPN 122 to output anchor object-ness scores. In an exemplary embodiment, the target frame 204 may be inputted to the RPN 122. The RPN 122 may be pre-trained to compute anchor boxes around objects determined to be relevant objects that may pertain to static objects that may possibly influence the operation of the vehicle 102 (e.g., traffic signs, traffic lights, buildings, mailbox, trees, and the like) apart from pathways and ceiling (e.g., predetermined area above the vehicle 102). The RPN 122 may additionally compute anchor boxes around objects determined to be relevant objects that may pertain to dynamic objects that may possibly influence the operation of the vehicle 102 (e.g., automobiles, pedestrians, bicyclists, bus, and the like).

In an exemplary embodiment, the RPN 122 may be configured to predict object proposals at each spatial location of the surrounding environment of the vehicle 102 captured within the target frame 204. The RPN 122 may be configured to predict a class-agnostic objectiveness score and may complete bounding box refinement for the anchor boxes to thereby output anchor object-ness scores 206 associated with the one or more refined bounding boxes. The anchor object-ness scores 206 may thereby provide object-ness scores with respect to likelihood of objects that include relevant objects that may possibly influence the operation of the vehicle 102. In one embodiment, the anchor object-ness scores 206 may be compared to a predetermined object-ness threshold score. Proposals that may include anchor object-ness scores 206 that are below the predetermined object-ness threshold score may indicate object classes other than the relevant objects (e.g., that do not include static and dynamic objects that should be considered as relevant since they may not possibly influence the operation of the vehicle 102) are removed (e.g., as irrelevant stuff) since they are irrelevant with respect to determine importance scoring for important objects that may influence the vehicle 102. Accordingly, object-ness scores that may be associated with relevant objects (e.g., as relevant things) that may impact the travel of the vehicle 102.

In an illustrative example, the anchor boxes with coordinates of (x1, y1, x2, y2)=(0.07, 0.91, 0.97, 1.0) (all box coordinates rescaled to [0,1]) may be computed so that the target frame 204 may contain the same number of proposals as another target frame 204 that may be determined for RGB image clips 208 determined during a different period of time. The anchor boxes may thereby be analyzed to compute bounding box refinement. Accordingly, one or more bounding boxes may be associated with anchor object-ness scores 206. In one embodiment, the anchor object-ness scores may be output to the proposal determinant module 130 of the attention reasoning application 106.

The method 300 may proceed to block 308, wherein the method 300 may include inputting RGB image clips 208 to the I3D 124 to output anchor importance scores 210. In one embodiment, the proposal determinant module 130 may input the RGB image clips 208 to the I3D 124 to be analyzed. The I3D 124 may be configured as a pre-trained convolutional neural network that may be configured to complete feature extraction of features included within the RGB image clips 208. In particular, the I3D 124 may be pre-trained to extract rich temporal and spatial features of which the temporal motion information may be important for reasoning both the vehicle's and other (dynamic) relevant object's intentions and future movements.

In particular, the I3D 124 enables spatial appearance information with respect to extracted features which may be utilized by the proposal determinant module 130 to determine inherent characteristics of each relevant object as determined to exist within the surrounding environment of the vehicle 102. In one embodiment, given T' continuous RGB image clips 208, "$B_{t,t+T'-1} \in R^{T' \times H' \times W' \times 3}$" the proposal determinant module 130 may be configured to input the RGB image clips 208 through the I3D 124 to extract features $F \in R^{T \times \bar{H} \times \bar{W} \times C}$ from a last mixing layer. The I3D 124 may thereby output anchor importance scores 210 that pertain to the inherent characteristics of the relavant objects based on the analysis of extracted features with respect to both the vehicle's and other (dynamic) relevant object's intentions and future movements to the proposal determinant module 130.

The method 300 may proceed to block 310, wherein the method 300 may include fusing the anchor object-ness scores and anchor importance scores. In an exemplary embodiment, the proposal determinant module 130 may fuse the anchor object-ness scores associated with each of the relevant objects and the anchor importance scores associated with the inherent characteristics of each of the respective relevant objects. The proposal determinant module 130 may fuse the anchor scores such that they are aggregated temporally by convolution along a temporal dimension. The proposal determinant module 130 may thereby determine a fused anchor score 212 that is associated with each respective relevant object that is included within the target frame 204 and the RGB image clips 208.

FIG. 4 is a process flow diagram of a method 400 of utilizing non-maximal suppression for object detection of the relevant objects and determining top relevant object proposals according to an exemplary embodiment of the present disclosure. FIG. 4 will be described with reference to the components of FIG. 1 and FIG. 2 though it is to be appreciated that the method 400 of FIG. 4 may be used with other systems/components. The method 400 may begin at block 402, wherein the method 400 may include completing non-maximal suppression on relevant objects associated with fused anchor scores.

In some circumstances, numerous anchor boxes that may be associated with respective fused anchor scores may be computed for particular objects (e.g., as portions of objects may be included in more than one anchor box). The proposal determinant module 130 may be configured to use non-maximal suppression 214 on the fused anchor scores associated with the (numerous) anchor boxes that may be computed for the relevant objects. The non-maximal suppression may use an intersection-over-union (IoU) threshold with respect to each of the anchor boxes and may analyze the fused anchor scores to select top box proposals that are associated with each respective relevant object. Accordingly, the proposal determinant module 130 may compute new bounding boxes based on the top box proposals that may fully encompass the pixels of the target frame/RGB image clips that include each of the respective relevant objects determined to be included within the surrounding environment of the vehicle 102.

Figure 5:
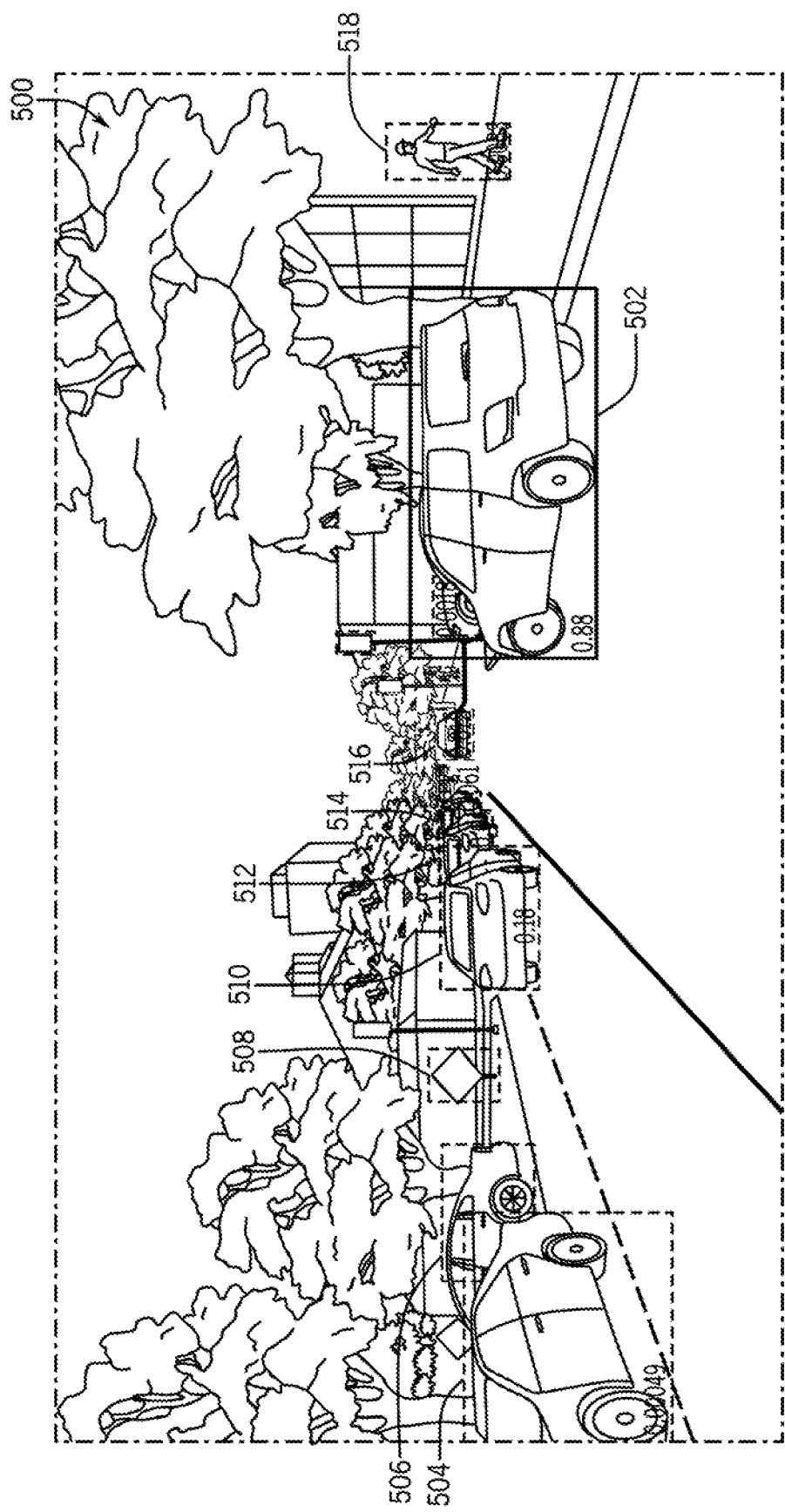
FIG. 5 is an illustrative example of a plurality of bounding boxes and associated importance scores that may be computed for relevant objects located within the surrounding environment of the vehicle according to an exemplary embodiment of the present disclosure.

As shown in the illustrative example of FIG. 5, bounding boxes 502-518 may be computed for relevant objects that may include automobiles, pedestrians, and other road side objects that may possibly have an influence with respect to the driving/operation of the vehicle 102. The target frame 500 may be updated with the bounding boxes 502-518 that encapsulate each of the relevant objects. Accordingly, each relevant object may no longer be associated with numerous anchor boxes based on the utilization of non-maximal suppression 214. In one embodiment, the fused anchor scores associated with each of the anchor boxes that previously included portions of each respective relevant object may be aggregated to determine aggregate fused anchor scores that may be associated with each respective bounding boxes 502-518 that encapsulate each of the respective relevant objects.

Referring again to the method 400 of FIG. 4, the method 400 may proceed to block 404, wherein the method 400 may include determining the top-K proposals 216. In an exemplary embodiment, the proposal determinant module 130 may be configured to analyze the bounding boxes 502-518 computed using non-maximal suppression 214 and may determine top-K proposals to determine top relevant objects. The top-k proposals may include a top k number of relevant objects that are considered the most relevant (e.g., k number of most relevant) with respect to having an influence on the driving/operation of the vehicle 102. In one embodiment, the proposal determinant module 130 may be configured to classify the top-k proposals as top relevant objects that may be further analyzed, as discussed below.

For example, with reference to FIG. 5 again, the relevant objects encompassed within a k number of the bounding boxes 502-518 may be included as top-K proposals and may be classified as top relevant objects based on their vicinity to the vehicle 102 from the point of view of the vehicle 102 as captured within the target frame 500. In an exemplary embodiment, upon classifying the top relevant objects based on the top-k proposals 216, the proposal determinant module 130 may communicate data pertaining to the top relevant objects, the anchor importance scores 210, and the fused anchor scores 212 to the graph conversion module 132 of the attention reasoning application 106.

With continued reference to FIG. 4, the method 400 may proceed to block 406, wherein the method 400 may include completing ROI pooling 218 of the anchor importance scores 210 and the top relevant objects to determine object node features. In an exemplary embodiment, the graph conversion module 132 may be configured to convert the data associated with the surrounding environment of the vehicle 102 and the top relevant objects into an interaction graphic format that includes nodes and edges of an interaction graph that corresponds to the each of the top relevant objects located within the surrounding environment of the vehicle 102 captured within the target frame 204 and/or the RGB image clips 208.

In one embodiment, the graph conversion module 132 may be configured to complete region of interest pooling 218 to determine object node features 220 associated with the top relevant objects. In particular, the ROI pooling 218 may be utilized to extract a (fixed-sized) feature map for each bounding box associated with a top relevant object. Extracted features F that may be derived based on machine learning completed by the I3D 124 to output the anchor importance scores 210, discussed above, may be aggregated temporally with one-layer convolution along only a temporal dimension by setting both a kernel size and a stride to T×1×1.

From the feature maps associated with each of the bounding boxes associated with top-K proposals, $F \in R^{1 \times H \times W \times C}$ the features $\{f_i | i=1, 2, \ldots, N\}$ are pooled using ROI pooling 218. Accordingly, object nodes of the interaction graph that may be associated with the top relevant objects may be determined. In one configuration, the temporal dimension may be removed resulting in feature vectors $\{f_i \in R^C | i=1, 2, \ldots, N\}$ for each object node.

The method 400 may proceed to block 408, wherein the method 400 may include computing interaction graph edges using adjacency matrix 222. In an exemplary embodiment, the graph conversion module 132 may be configured to utilize an adjacency matrix 222 to formulate graph edges. The adjacency matrix 222 may be configured to connect object nodes that are adjacent to one another to determine edges. In one embodiment, the graph conversion module 132 may be configured to predict the edge strength $E_{ij}$ by estimating how closely two object nodes i and j interact with each other. Given node features $v_i$ and $v_j$, an interaction score $IS_{ij}$ may be computed by:

$$IS_{ij} = \Phi(\Gamma(v_i) \| \Gamma'(v_j)),$$

$$i,j \in \{1,2,\ldots,N\}$$

where $\Gamma(\bullet)$ and $\Gamma(\bullet)'$ are linear transformations with different learning parameters, $$\Phi(x) = \phi x$$

is linear transformation with Ø as learned parameters and ∥ denotes concatenations.

With an interaction matrix, IS obtained by computing interaction scores for each pair of object nodes. The graph conversion module 132 may be configured to calculate $E_{ij}$ by applying softmax on IS similarly as well as adding an identity matrix $I_N \in R^{N \times N}$ to force self-attention:

$$E_{ij} = \frac{e^{IS_{ij}}}{\sum_{k=1}^{N} e^{IS_{ik}}}$$

$$i, j \in \{1, 2, \ldots, N\}$$

Accordingly, the model learned as an interaction graph itself is based on each object node's features (associated with each top relevant object). The learnt edge strength $E_{ij}$ indicates how much effect object node j will have on updating object node i's features through graph convolution and may therefore reflect how closely they are interacting.

In an alternate embodiment, the graph conversion module 132 may be configured to formulate each graph edge with feature similarity between object nodes i and j. With node features $v_i$ and $v_j$ the similarity $S_{ij}$ may be measured by:

$$S_{ij} = \Gamma(v_i)^T \Gamma'(v_j), i,j \in \{1,2,\ldots,N\} \text{ where } \Gamma(v) = w v \Gamma'(v)$$
$$= w'v$$

$\Gamma(\bullet)$ and $\Gamma(\bullet)'$ are linear transformations with different learning parameters ω and ω'. By computing $S_{ij}$ for each pair of object nodes, a similarity matrix $S \in R^{N \times N}$ may be determined after which $E_{ij}$ is obtained by applying softmax on each column of S for normalization:

$$E_{ij} = \frac{e^{lS_{ij}}}{\sum_{k=1}^{N} e^{lS_{ik}}}$$

$$i, j \in \{1, 2, \ldots, N\}$$

In one configuration, since Γ(•) and Γ(•)' are different transformations, a direction graph may be formulated and may be utilized to determine the importance score associated with each top relevant object. However, for purposes of simplicity, this disclosure will focus on the interaction graph being utilized to determine the importance score associated with each top relevant object.

Figure 6:
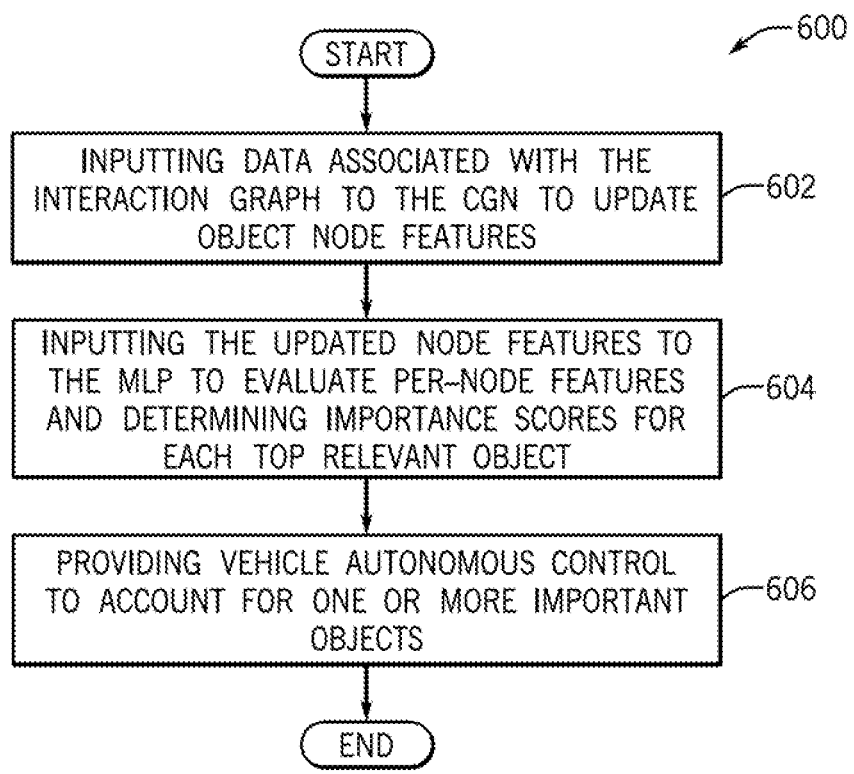
FIG. 6 is a process flow diagram of a method for passing the K node features and the edges of the interaction graph through the graph convolution network and determining importance scores for objects located within the surrounding environment of the vehicle according to an exemplary embodiment of the present disclosure.

FIG. 6 is a process flow diagram of a method 600 for passing the K node features and the edges of the interaction graph through the GCN 108 and determining importance scores for objects located within the surrounding environment of the vehicle 102 according to an exemplary embodiment of the present disclosure. FIG. 6 will be described with reference to the components of FIG. 1 and FIG. 2 though it is to be appreciated that the method 600 of FIG. 6 may be used with other systems/components. In an exemplary embodiment, upon determining the object nodes and the edges of the interaction graph that is associated with the surrounding environment of the vehicle 102 captured within the target frame 204 and/or the RGB image clips 208, the graph conversion module 132 may communicate respective data to the object scoring module 134 of the attention reasoning application 106.

The method 600 may begin at block 602, wherein the method 600 may include inputting data associated with the interaction graph to the GCN 108 to update object node features. With the graph E formulated, the object scoring module 134 may input data associated with the object node features 220 and the edges of the interaction graph as computing using the adjacency matrix 222 to the GCN 108. The GCN 108 may be utilized to update the object node features 220 by interacting with other object nodes through graph convolution based on the learnt interaction graph edges. Accordingly, the object nodes may update each other. One layer of graph convolution may be represented as:

$$V' = \sigma(EVW)$$

where $E \in R^{N \times N}$ is an edge matrix, $V = [v_1, v_2, \ldots, v_n] \in R^{N \times C}$ is an input node feature matrix, and $W \in R^{C \in c}$ is a weight matrix of the layer. $\sigma^{(•)}$ is a non-linear function. In one embodiment, three graph convolutional layers may be stacked and C'=C may be set for all of them. The output of the GCN 108 may be updated feature matrix $U \in R^{N \times C}$ with updated node features 224 to capture a long-range relationship with other object nodes. These features are updated by interacting with other object nodes based on the learnt interaction graph edges (e.g., interaction graph edges).

With continued reference to the method 600 of FIG. 6, the method 600 may proceed to block 604, wherein the method 600 may include inputting the updated node features 224 to the MLP 126 to evaluate per-node features and determining importance scores for each top relevant object. In an exemplary embodiment, upon the GCN 108 outputting the updated node features 224, the object scoring module 134 may input the updated node features 224 to the MLP 126 to perform per-node object importance estimation. In particular, the object scoring module 134 may apply global average pooling on the extracted features F from I3D 124 (discussed above) to obtain a global descriptor $D \in R^{1 \times C}$ which are further tiled N times and concatenated with the updated node features 224 U. Each row of the resulting features $Y \in R^{N \times 2C}$ is inputted to the MLP 126 for the final importance score estimation. Stated differently, the MLP 126 may be trained to output importance scores for each top relevant object 226 within a probability range (0-1) based on the updated node features 224 that are concatenated with the global descriptor and fed into the MLP 126.

The method 600 may proceed to block 606, wherein the method 600 may include providing vehicle autonomous control 228 to account for one or more important objects. In an exemplary embodiment, upon determining the importance scores for each of the top relevant objects that are determined by the MLP 126, the object scoring module 134 may communicate scoring data to the vehicle control module 136 of the attention reasoning application 106. In one configuration, the vehicle control module 136 may be configured to compare the importance scores for each top relevant object 226 to a predetermined importance scoring threshold value that pertains to objects that may that may have an immediate/high degree of influence with respect to the driving/operation of the vehicle 102.

Accordingly, the vehicle control module 136 may compare the importance score for each top relevant object 232 to the predetermined importance scoring threshold value to account for objects that are assigned an importance score that are above the predetermined importance threshold value. In one embodiment, upon determining one or more top relevant objects that include importance scores that are above the predetermined importance scoring threshold value, the vehicle control module 136 may classify the respective top relevant objects as important objects.

In an exemplary embodiment, upon classifying the one or more important objects, the vehicle control module 136 may determine a ranking of importance of the important objects based on a scale of highest to lowest importance scores that were assigned to the respective objects by the MLP128. For example, important objects that may be closely located to the vehicle 102 and/or may or potentially located within the vehicle's path may include an importance score that may be ranked higher than an important object that may not be located as close to the vehicle 102 or may not be located within the vehicle's path.

In one or more embodiment, upon ranking the importance of the important objects, the vehicle control module 136 may be configured to communicate one or more commands (e.g., data signals) to the vehicle autonomous controller 114 and/or the ECU 104 to autonomously control the vehicle 102 to account for the one or more important objects. In some circumstances, the one or more important objects may be accounted for based on the ranked importance of the important objects. Referring again to the illustrative example of FIG. 5, as shown each of the bounding boxes 502-518 may be associated with respective importance scores. The vehicle autonomous controller 114 and/or the ECU 104 may communicate with one or more of the control units of the vehicle 102 to thereby control the operation of the vehicle 102.

The vehicle control module 136 may determine one or more actions with respect to vehicle autonomous control 228 of the vehicle 102 to operate the vehicle 102 in a manner that is influenced by the locations, positons, and/or trajectories of one or more important objects that are located within the surrounding environment of the vehicle 102. More specifically, the vehicle 102 may be controlled to execute one or more actions that may be conducted in a particular manner(s) (e.g., with the application of a particular speed, acceleration, steering angle, throttle angle, braking force, etc.) to account for the one or more highly important road users.

Referring again to the illustrative example of FIG. 5, the vehicle control module 136 may determine one or more actions with respect to vehicle autonomous control 228 of the vehicle 102 to operate the vehicle 102 in a manner that is influenced by the locations, positons, and/or trajectories of one or more important objects that may be classified as such based on an importance score that is above 0.0070. Accordingly, the vehicle 102 may thereby be operated in a manner that accounts for the one or more important objects such that the one or more important objects may have a varying level of influence based on the respective importance scores that may be applied toward the driving/operation of the vehicle 102.

In one or more embodiments, one or more of the vehicle sensors 110 may provide sensor data to the vehicle autonomous controller 114 to be utilized in complement to the commands provided by the vehicle control module 136 to thereby operate the vehicle 102 in a manner that is influenced by the locations, positons, and/or trajectories of one or more important objects that are located within the surrounding environment of the vehicle 102 and/or sensor based observations associated with the surrounding environment of the vehicle 102.

Figure 7:
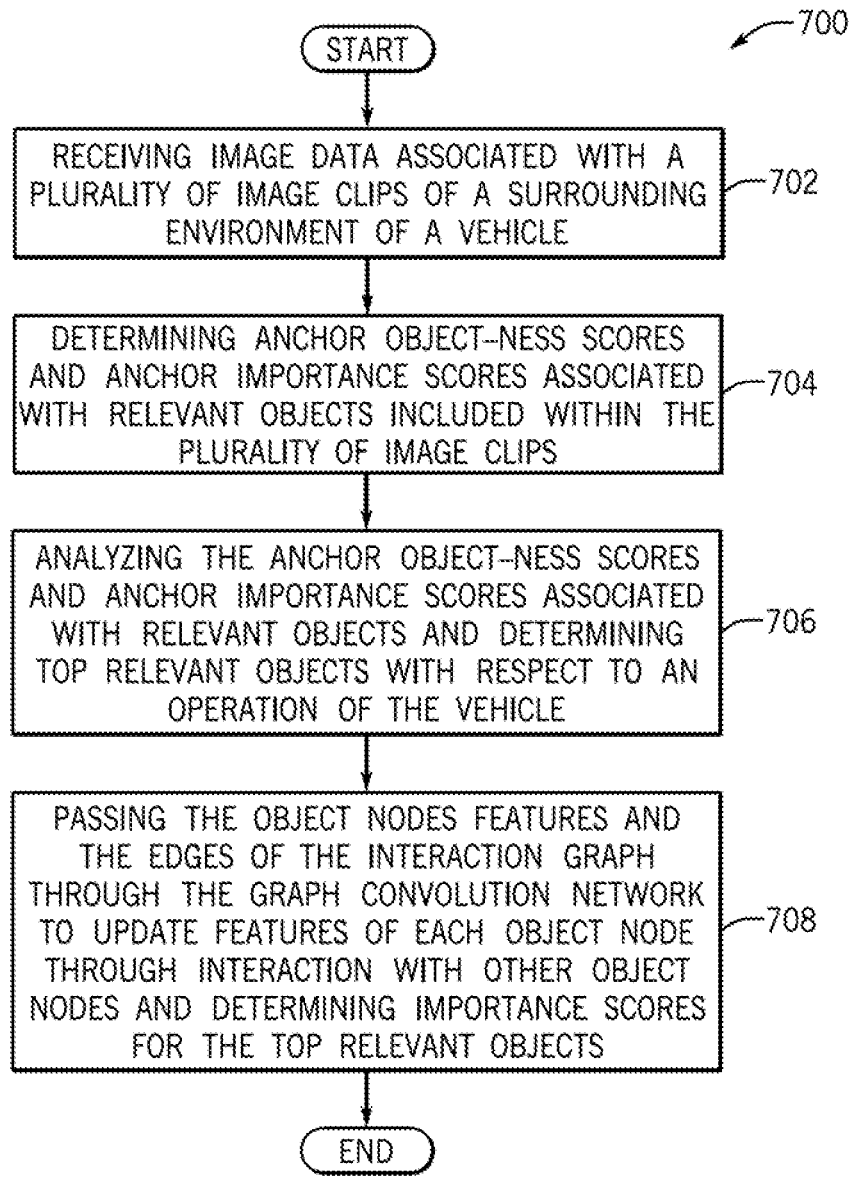
FIG. 7 is a process flow diagram of a method for providing object-level driver attention reasoning with a graph convolution network according to an exemplary embodiment of the present disclosure.

FIG. 7 is a process flow diagram of a method 700 for providing object-level driver attention reasoning with a graph convolution network according to an exemplary embodiment of the present disclosure. FIG. 7 will be described with reference to the components of FIG. 1 and FIG. 2 though it is to be appreciated that the method 700 of FIG. 7 may be used with other systems/components. The method 700 may begin at block 702, wherein the method 700 may include receiving image data associated with a plurality of image clips of a surrounding environment of a vehicle 102.

The method 700 may proceed to block 704, wherein the method 700 may include determining anchor object-ness scores and anchor importance scores associated with relevant objects included the plurality of image clips. The method 700 may proceed to block 706, wherein the method 700 may include analyzing the anchor object-ness scores and anchor importance scores associated with relevant objects and determining top relevant objects with respect to an operation of the vehicle 102. In one embodiment, object node features associated with the top relevant objects and edges of an interaction graph that pertain to the surrounding environment of the vehicle 102 are determined. The method 700 may proceed to block 708, wherein the method 700 may include passing the object node features and the edges of the interaction graph through the GCN 108 to update features of each object node through interaction with other object nodes and determining importance scores for the top relevant objects.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing object-level driver attention reasoning with a graph convolution network comprising:
   receiving image data associated with a plurality of image clips of a surrounding environment of a vehicle;
   determining anchor object-ness scores that are associated with a likelihood that relevant objects included within the plurality of image clips influence an operation of the vehicle;
   determining anchor importance scores that are associated with inherent characteristics of each of the relevant objects included within the plurality of image clips;
   analyzing the anchor object-ness scores and the anchor importance scores associated with relevant objects and determining top relevant objects that are likely to influence a path of the vehicle, wherein object node features associated with the top relevant objects and edges of an interaction graph that pertain to the surrounding environment of the vehicle are determined; and
   passing the object node features and the edges of the interaction graph through the graph convolution network to update features of each object node through interaction with other object nodes and determining importance scores for the top relevant objects.

2. The computer-implemented method of claim 1, wherein receiving image data includes analyzing the image data received from a vehicle camera system of the vehicle and determining the plurality of image clips and a target image frame based on images captured for a predetermined period of time.

3. The computer-implemented method of claim 2, wherein determining the anchor object-ness scores includes inputting the target image frame to a regional proposal network to output the anchor object-ness scores, wherein the anchor object-ness scores are associated with anchor boxes that encapsulate portions of the relevant objects.

4. The computer-implemented method of claim 2, wherein determining the anchor importance scores includes inputting the plurality of image clips to an I3D convolutional neural network to extract features associated with each of the relevant objects and to output associated anchor importance scores.

5. The computer-implemented method of claim 2, wherein analyzing the anchor object-ness scores and the anchor importance scores includes fusing the anchor object-ness scores and the anchor importance scores into fused anchor scores that pertain to each of the relevant objects, wherein non-maximal suppression is completed with respect to the relevant objects associated with fused relevant scores to compute bounding boxes that encapsulate each of the relevant objects.

6. The computer-implemented method of claim 5, wherein analyzing the anchor object-ness scores and the anchor importance scores includes analyzing the bounding boxes and determining top-k proposals to determine the top relevant objects, wherein the top relevant objects are a top-k number of relevant objects with respect to having an influence on the operation of the vehicle.

7. The computer-implemented method of claim 5, wherein analyzing the anchor object-ness scores and the anchor importance scores includes completing region of interest pooing of the anchor importance scores and the top relevant objects to determine the object node features associated with the top relevant objects, wherein an adjacency matrix is used to compute the edges of the interaction graph.

8. The computer-implemented method of claim 1, further including inputting updated node features of each object node output by the graph convolution network to a multi-layer perceptron neural network to determine the importance scores for the top relevant objects.

9. The computer-implemented method of claim 8, wherein the importance scores for the top relevant objects are compared to a predetermined importance scoring threshold value to determine at least one important object, wherein the vehicle is autonomously controlled to account for the at least one important object.

10. A system for providing object-level driver attention reasoning with a graph convolution network comprising:
a memory storing instructions when executed by a processor cause the processor to:
receive image data associated with a plurality of image clips of a surrounding environment of a vehicle;
determine anchor object-ness scores that are associated with a likelihood that relevant objects included within the plurality of image clips influence an operation of the vehicle;
determine anchor importance scores that are associated with inherent characteristics of each of the relevant objects included within the plurality of image clips;
analyze the anchor object-ness scores and the anchor importance scores associated with relevant objects and determining top relevant objects that are likely to influence a path of the vehicle, wherein object node features associated with the top relevant objects and edges of an interaction graph that pertain to the surrounding environment of the vehicle are determined; and
pass the object node features and the edges of the interaction graph through the graph convolution network to update features of each object node through interaction with other object nodes and determining importance scores for the top relevant objects.

11. The system of claim 10, wherein receiving image data includes analyzing the image data received from a vehicle camera system of the vehicle and determining the plurality of image clips and a target image frame based on images captured for a predetermined period of time.

12. The system of claim 11, wherein determining the anchor object-ness scores includes inputting the target image frame to a regional proposal network to output the anchor object-ness scores, wherein the anchor object-ness scores are associated with anchor boxes that encapsulate portions of the relevant objects.

13. The system of claim 11, wherein determining the anchor importance scores includes inputting the plurality of image clips to an I3D convolutional neural network to extract features associated with each of the relevant objects and to output associated anchor importance scores.

14. The system of claim 11, wherein analyzing the anchor object-ness scores and the anchor importance scores includes fusing the anchor object-ness scores and the anchor importance scores into fused anchor scores that pertain to each of the relevant objects, wherein non-maximal suppression is completed with respect to the relevant objects associated with fused relevant scores to compute bounding boxes that encapsulate each of the relevant objects.

15. The system of claim 14, wherein analyzing the anchor object-ness scores and the anchor importance scores includes analyzing the bounding boxes and determining top-k proposals to determine the top relevant objects, wherein the top relevant objects are a top-k number of relevant objects with respect to having an influence on the operation of the vehicle.

16. The system of claim 14, wherein analyzing the anchor object-ness scores and the anchor importance scores includes completing region of interest pooing of the anchor importance scores and the top relevant objects to determine the object node features associated with the top relevant objects, wherein an adjacency matrix is used to compute the edges of the interaction graph.

17. The system of claim 10, further including inputting updated node features of each object node output by the graph convolution network to a multi-layer perceptron neural network to determine the importance scores for the top relevant objects.

18. The system of claim 17, wherein the importance scores for the top relevant objects are compared to a predetermined importance scoring threshold value to determine at least one important object, wherein the vehicle is autonomously controlled to account for the at least one important object.

19. A non-transitory computer readable storage medium storing instructions that when executed by a computer, which includes a processor perform a method, the method comprising:
receiving image data associated with a plurality of image clips of a surrounding environment of a vehicle;
determining anchor object-ness scores that are associated with a likelihood that relevant objects included within the plurality of image clips influence an operation of the vehicle;
determining anchor importance scores that are associated with inherent characteristics of each of the relevant objects included within the plurality of image clips;
analyzing the anchor object-ness scores and anchor importance scores associated with relevant objects and determining top relevant objects that are likely to influence a path of the vehicle, wherein object node features associated with the top relevant objects and edges of an interaction graph that pertain to the surrounding environment of the vehicle are determined; and
passing the object node features and the edges of the interaction graph through a graph convolution network to update features of each object node through interaction with other object nodes and determining importance scores for the top relevant objects.

20. The non-transitory computer readable storage medium of claim 19, further including inputting updated node features of each object node output by the graph convolution network to a multi-layer perceptron neural network to determine the importance scores for the top relevant objects.

* * * * *